Dec. 27, 1960     A. F. APPLEGATE     2,966,093
PHOTOGRAPHIC SEQUENCE EXPOSURE APPARATUS

Filed May 3, 1957     2 Sheets-Sheet 1

INVENTOR.
ALVIN F. APPLEGATE
BY
*Harry M. Saragovitz*
ATTORNEY

Dec. 27, 1960   A. F. APPLEGATE   2,966,093
PHOTOGRAPHIC SEQUENCE EXPOSURE APPARATUS
Filed May 3, 1957   2 Sheets-Sheet 2
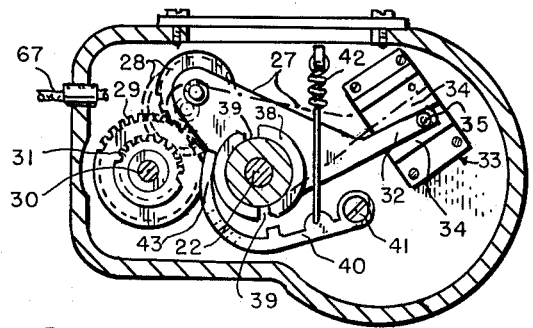
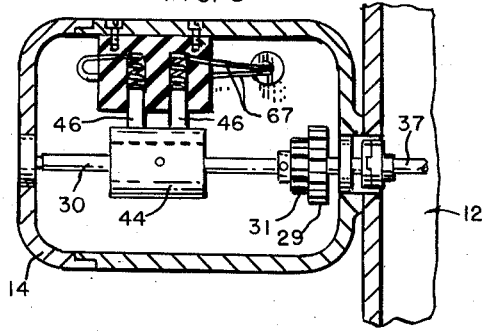
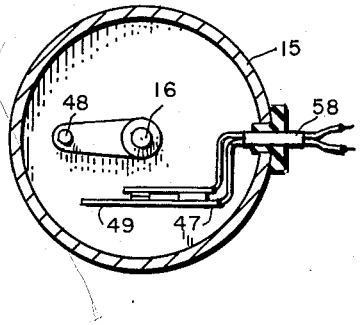
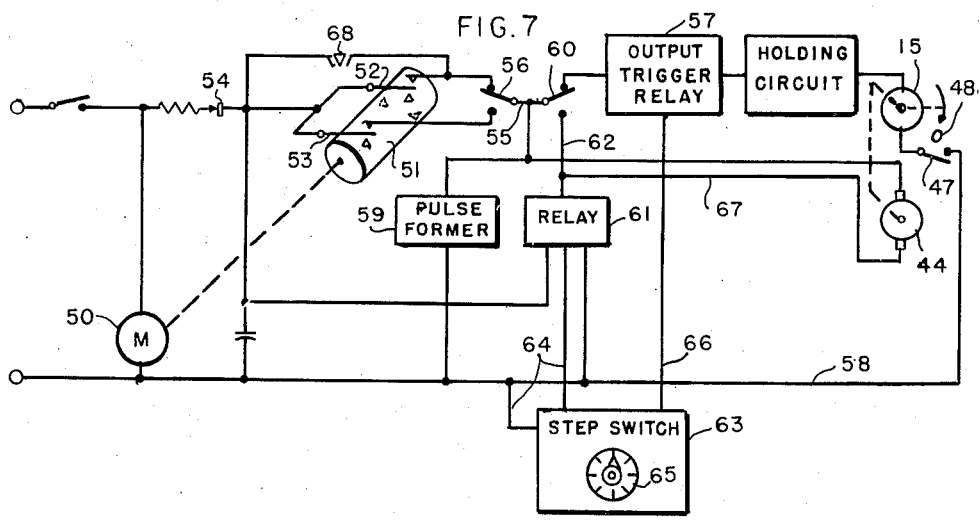
INVENTOR.
ALVIN F. APPLEGATE
BY
Harry M. Saragovitz
ATTORNEY

United States Patent Office 2,966,093
Patented Dec. 27, 1960

2,966,093

PHOTOGRAPHIC SEQUENCE EXPOSURE APPARATUS

Alvin F. Applegate, Sea Girt, N.J., assignor to the United States of America as represented by the Secretary of the Army Filed May 3, 1957, Ser. No. 656,995

2 Claims. (Cl. 88—16)

(Granted under Title 35, U.S. Code (1952), sec. 266)

The invention described herein may be manufactured and used by or for the Government for governmental purposes, without the payment of any royalty thereon.

This invention relates to photographic cameras and particularly to such devices suitable for specialized sequence photography which is outside the realm of motion picture and still type cameras.

The invention is a supplementary apparatus which may be readily applied to a conventional motion picture camera and when so applied converts such a camera into a device having a wide range of time periods between the exposure of successive frames on strip film, and time exposures of widely varying extent are also obtainable. Moreover, the time periods between successive exposures may vary from frame to frame or successive exposures may be made automatically to record a series of events in accordance with phenomena occurring at regular or random intervals.

Preferably, but not essentially, the invention is assembled as a unitary component detachably secured to the camera it operates and desirably is made interchangeable with the conventional motor applied to operate the camera as a motion picture device. The unitary component will hereinafter be termed the driving unit. The motor for the driving unit is of the type wherein for a given power input there will result a limited mechanical output which will terminate at the end of a specific cycle of operation and will not again function until its mechanical movement is restored and input power is again applied at which time the cycle is repeated. Such a motor may be an electro-magnetic solenoid.

Special means are employed to transmit the output of the motor to the driving shaft of the camera to impart thereto a measured angular displacement thereof sufficient only to move the camera shutter through one full exposure cycle or one-half of one full exposure cycle each time the driving unit is energized. Means are also provided to lock the camera shutter against over travel and thus maintain its function under complete control of and in synchronism with the driving unit.

It is a primary object of the invention to provide an efficient and universally adaptable sequence camera.

It is a further object of the invention to provide a simple low cost auxiliary film feed and exposure control device for operation of a strip film camera as a universal sequence camera.

A further object of the invention is to provide a system of photography wherein pictures may automatically be taken of a chain of events occurring in regular or random sequence.

A further object of the invention is to provide a sequence camera in which the shutter is provided with automatic over-ride preventing means to maintain the sequence driving unit in synchronism with the camera shutter and film feed.

Other objects and features of the invention will more fully appear from the following description and will be particularly pointed out in the claims.

To provide a better understanding of the invention a particular embodiment thereof will be described and illustrated in the accompanying drawings in which:

Fig. 4 is a cross section on line 4—4, Fig. 2;

Fig. 5 is a cross section on line 5—5, Fig. 3;

Fig. 6 is a detail view illustrating a circuit breaking device for the protection of the rotary solenoid motor; and Fig. 7 is a circuit diagram of a preferred manner of electrically operating and controlling the apparatus.

The apparatus to be described is an example of a satisfactory form of the invention. It is to be noted, however, that the invention may differ therefrom in certain respects while still within the spirit and scope of the appended claims.

Figure 1:
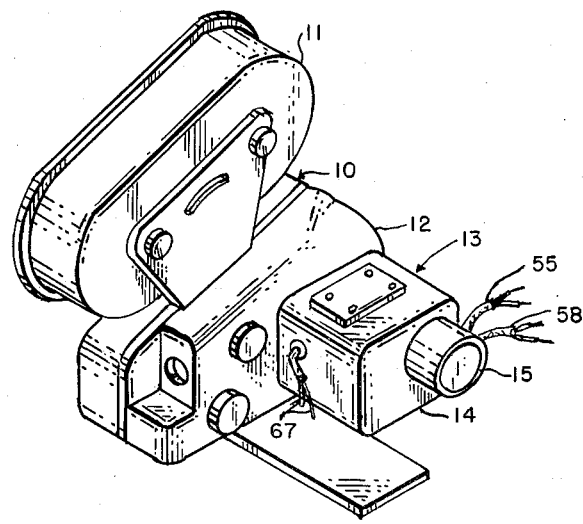
Fig. 1 is a perspective view of a desirable form of the invention.
Figure 2:
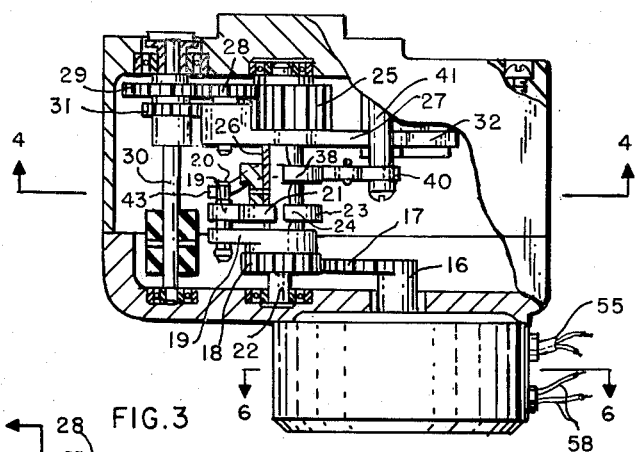
Fig. 2 is a plan view in partial cross section of the driving mechanism for the camera.
Figure 3:
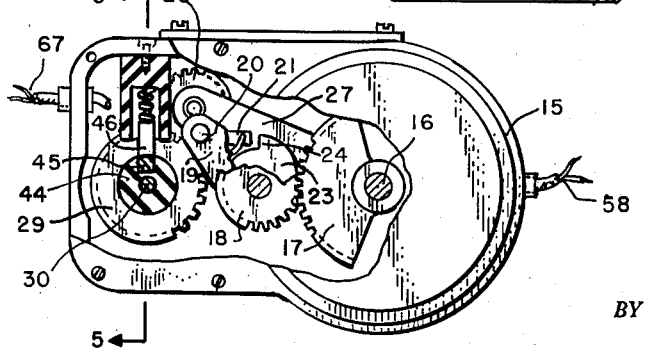
Fig. 3 is a front elevation of the device with parts broken away.

Referring to the drawings, Fig. 1 shows a camera indicated generally at 10 having a strip film receiving casing 11 mounted upon a housing 12 enclosing the film feeding and shutter mechanism. In a camera of this type provision is made to couple a driving motor thereto such as a constant speed electric motor, a selsyn motor or other conventional type of motor. In the present invention a specialized driving mechanism is applied to the camera. This drive functions to control the camera shutter and film transport to make successive exposures upon the film strip at a wide range of time intervals and time exposures. This driving mechanism is indicated generally at 13 and desirably is enclosed in a casing 14. Its driving motor is of the intermittent type which performs a predetermined cycle when energized and repeats the cycle when again energized. A desirable form of such a motor is an electromagnetic solenoid. It is desirable that the motor be as compact and light in weight as possible and should also have as nearly as possible a uniform torque output. Such requirements have been found to be substantially filled by a rotary type solenoid 15 which for each application of energy thereto will rotate its output shaft 16 approximately 100° and deliver a substantially constant torque. The motor is provided with automatic return stroke driving means acting after completion of its power stroke. Such a motor is well known in the art and for this reason a detail description thereof will not be given.

The solenoid motor desirably is secured to the casing 14 with its shaft 16 projecting into the casing. The shaft has secured thereto a segmental gear 17. The gear 17 meshes with a gear 18 to which is secured a ratchet pawl carrying arm 19 having a pin 20 secured in its outer end upon which is pivoted a pawl 21. The gear 18 and arm 19 are fixed upon a shaft 22 which in turn is rotatably mounted in the casing 14. The pawl 21 engages and drives a ratchet member 23. The ratchet 23 is provided with two teeth 24 spaced 180°. In the apparatus shown the total work stroke of the solenoid and the driving ratio between the segment 17 and the gear 18 are adjusted to rotate the arm 19 180°. Other values may be employed to adapt the apparatus to a particular use. The ratchet 23 in turn is positively connected to a gear 25 through the medium of a sleeve shaft 26 which rotates freely upon the shaft 22. The gear 25 is thus driven intermittently by a ratchet or one way clutch.

The gear 25 is spaced from the ratchet 23 along the sleeve 26 a sufficient distance to receive a gear shifting member 27. The space is sufficient to permit the gear shifting member to move axially along the sleeve 26. The member 27 pivots freely upon the sleeve shaft 26 and has an idler gear 28 rotatably mounted thereon. The member 27 may be swung into two positions. In one position its idler gear 28 meshes with a gear 29 fixed upon a camera driving shaft 30 while in its other position it meshes with a gear 31 also fixed upon the shaft 30. When shifting from one position to the other the shifting member 27 is moved axially to align the gear 28 with either the gear 29 or 31. When so changing gear ratios the member 27 must be rotated about the axis of the shaft 26 to effect meshing of the gears. Desirably means are provided to lock the member 27 in either of its driving positions. This may be accomplished in any suitable manner. As shown in Fig. 4, an extension 32 of the member 27 engages a locking plate 33 fixed to the casing. The locking plate has two flat-faces 34 located in planes corresponding to the planes occupied by the gears 29 and 31. The extension is provided with a locking pin 35 which is received in apertures in the faces 34. The locking pin may be axially movable and spring pressed into locking position.

The driving ratios of the gears are chosen to provide the desired angular travel of the shaft 30. This shaft is positively coupled to the drive shaft 37 of the camera 10. Any suitable camera may be coupled to the mechanism of the invention. A desirable camera type is a conventional motion picture camera having a rotating disc type shutter mounted upon a driven shaft such as the shaft 37 and wherein the disc has an exposure aperture movable across the film gate to make an exposure. Film is fed from frame to frame by the feed mechanism supplied by such cameras. Since the shutter and film feed are conventional it is believed that they need not be illustrated and described in more detail. The camera shutter is a conventional rotating disc type operating in the path of light beam from the camera lens to the film and having one or more apertures therein near its periphery. In the invention at one gear ratio for one actuation of the drive motor the disc is moved through an angle of rotation which moves a disc aperture from its closed position to and through the light beam and to its closed position where it stops thus completing its exposing cycle. At its other gear ratio the drive motor moves the disc through an angle to move its aperture from closed to open position with the aperture at the light beam and upon a succeeding actuation of the motor the disc aperture is moved to closed position. Other gearing arrangements may be used depending upon the results desired and the camera construction.

Means are provided for preventing over-travel of the driving mechanism and to lock it against movement at the end of the power stroke of the solenoid 15. To achieve this result the ratchet 23 is provided with a latching portion 38 having stop notches 39 which coact with a detent 40 pivoted upon a post 41 rigid with the casing. The notches are spaced 180° and receive the detent at the end of the power stroke of the solenoid. A spring 42 causes the detent to enter one of the notches 39 thus preventing further motion of the mechanism. The detent 40 has an extension 43 which projects into the path of an extension of the pin 20 on the pawl arm 19. At the end of the solenoid power stroke the pin is near the upper end of its travel remote from the extension 43. When the power is cut off from the solenoid its inherent restoring device reverses the movement of the arm 19 and at a point near the end of its travel the pin 20 strikes the extension 43 and moves the detent out of its locking position thus conditioning the mechanism for its next cycle of operation.

The camera drive shaft 30 has mounted thereon a commutator 44 which is designed to act as a single pole series type switch which functions in connection with the operating circuit of the apparatus in a manner to be described. The switch may have any suitable construction. As shown it comprises a cylinder of insulating material within the surface of which a bar of metal 45 is fixed. Acting in conjunction with the bar 45 are two brushes 46 which are freely received in spaced apertures in a holder of insulating material secured to the casing in position to cause the brushes to ride upon the commutator. At a selected position of the commutator therefore a circuit connected to the brushes is closed.

Means are also provided to protect the solenoid 15 from excessive heating and to insure that there will not be a succession of malfunctions of the picture taking cycle wherein valuable data may be lost. To accomplish this result a normally closed switch 47 is mounted upon or within the casing of the solenoid 15. A pin 48 is fixed to the rotor of the solenoid in position to engage the switch electrode 49 to open the circuit when the solenoid has completed its power stroke. Thus unnecessary or accidental application of power to the solenoid after completion of its power cycle is avoided and also if power flowing to the solenoid is accidently cut off at the outset before completion of the power stroke the next succeeding pulse of power will complete the power stroke and cause the apparatus to again follow its normal cycle.

The apparatus may be operated manually by the simple expedient of successively energizing the solenoid by actuating a switch in the circuit of a suitable source of power. However, to obtain the full benefit of the scope and precise operation of the apparatus a circuit is presented which provides for highly diversified programs of automatic sequence operation.

Power to operate the solenoid is conveniently derived from a standard source of alternating current such as a commercial 120 v. line which preferably is frequency controlled to provide accurate timing facility. A timing clock 50 is connected across the 120 v. alternating current line and has attached to its output shaft a program drum 51 upon which are secured a plurality of groups of equally spaced cams. For example, in the apparatus described, at one portion of the drum there is one such cam and at a second portion along the drum there are three cams. Switches 52 and 53 are located to be actuated by the respective groups of cams.

The alternating current line has inserted therein a rectifier 54 for converting the power to direct current. The rectified current is fed to one pole of the switches 52 and 53 while the other pole of the switches are connected to a line 55 through a manual selector switch 56. The line 55 leads to a trigger relay 57. The relay output is connected to the solenoid 15 through a holding circuit. A return path for the current is provided by the line 58. Preferably a pulse forming circuit 59 is provided to shape an accurate and uniform pulse of current. The holding circuit insures that actuating current will be applied to the solenoid for an interval sufficient to drive it through its complete power stroke.

If the clock is adjusted to provide one revolution of its output shaft per minute, pulses of one a minute or three per minute may be obtained from the output of the timing drum by the selector switch 56. In the above described cycle the gear ratio of the driving unit 13 is adjusted to produce a complete open and closing cycle of the camera shutter and the duration of the exposure is determined by the shutter construction together with the torque developed by the solenoid all of which may be selected or determined for the range of use to which the apparatus is applied. Further adjustment of the repetition rate of exposures may be made by changing the speed of the output shaft of the clock motor 50. Clocks having such adjustability are available.

The pulse former desirably is designed to provide a pulse having a width as small as 15 milliseconds thus to provide for a relatively rapid sequence of exposures. If desired the time between successive exposures may be extended to relatively long periods by inserting a two position switch 60 in the line 55. With this switch, connection may be made to the actuating coil of a relay 61 through the lead 62 which results in energization of a step switch 63 through leads 64 connected across the input direct current power leads. The step switch is provided with dial means 65 for selecting the particular step at which contact will be made to its output lead 66 which in turn is connected to the trigger relay 57. Such step switches are well known. Through the step switch 63 therefore multiples of the time intervals provided by the drum 51 are obtained for actuation of the solenoid 15.

The above described timing system is also used for timing the duration of exposures. For this purpose the ratio of drive within the mechanism 13 is adjusted to open the camera shutter upon a first actuation of the solenoid and to close the shutter on a second actuation of the solenoid. The switch 60 is adjusted to route the pulses through the line 55. Thus the first pulse passes through the relay 57 and actuates the solenoid 15 which opens the shutter. At this time the commutator switch 44 is closed which completes the circuit leading to the relay 61 which, in turn, when energized actuates the step switch 63. The second pulse and successive pulses now provide multiples of time intervals from the clock 50 and drum 51. When the required interval has elapsed contact is made to line 66 which actuates the solenoid to close the camera shutter after which the next pulse will open the shutter and the cycle will repeat. A manual switch 68 is provided connected across the switches 52 and 53 whereby the camera may be controlled at will.

It is also possible for the apparatus to be controlled automatically by timing pulses to trigger actuation of the solenoid in response to any recurring phenomena which it is desired to record upon the film.

What is claimed is:

1. In combination with a camera having a shutter, a synchronized film strip advancing means and a camera driving shaft, a sequence exposure apparatus comprising a casing secured to the camera, an output shaft rotatable in said casing and direct coupled to said camera drive shaft, a rotary solenoid motor secured to the casing, a one way clutch in said casing having driving connection with said motor, a gear driven by said clutch, means to lock said gear in a predetermined position at the end of each power stroke of said motor, a gear shifting transmission in said casing interconnecting said gear and said output shaft, said transmission having one driving ratio computed to actuate the camera shutter through a complete exposure cycle and one ratio computed to open and close the shutter during successive actuations of said motor and means for successively actuating said motor.

2. In combination with a camera having a shutter, film advancing means synchronized with said shutter to make successive exposures on a film strip and a camera driving shaft, a sequence exposure apparatus comprising a reciprocating electromagnetic motor operable to deliver a single work stroke upon each application of power thereto, a gear transmission connecting said motor to said camera drive shaft having at least two driving ratios one of which causes the shutter to perform a complete exposure cycle and the other ratio causes the shutter to open and close during successive actuations of the motor, a timing clock having means to produce a succession of electrical pulses operable to initiate energization of said electromagnetic motor and an automatic step switch connected to said electromagnetic motor having manual step selection, switching means to connect the input of said step switch to receive said pulses, an output connection from said step switch to said electromagnetic motor whereby a plurality of multiples of clock measured intervals may be applied to said electromagnetic motor.

References Cited in the file of this patent

UNITED STATES PATENTS

| | | |
|---|---|---|
| 1,848,693 | Briechle | Mar. 8, 1932 |
| 2,279,119 | Freemann | Apr. 7, 1942 |
| 2,388,686 | Habig | Nov. 13, 1945 |
| 2,410,925 | Burrell | Nov. 12, 1946 |
| 2,441,185 | Brown et al. | May 11, 1948 |
| 2,498,070 | Coleman | Feb. 21, 1950 |
| 2,553,223 | Walsh et al. | May 15, 1951 |
| 2,569,031 | Warner et al. | Sept. 25, 1951 |
| 2,761,099 | Berry et al. | Aug. 28, 1956 |
| 2,791,933 | Crockett | May 14, 1957 |
| 2,792,767 | Schmidt | May 21, 1957 |